United States Patent [19]

Mukohyama et al.

[11] Patent Number: 5,798,188
[45] Date of Patent: Aug. 25, 1998

[54] POLYMER ELECTROLYTE MEMBRANE FUEL CELL WITH BIPOLAR PLATE HAVING MOLDED POLYMER PROJECTIONS

[75] Inventors: Atsushi Mukohyama; Toshihiko Takeda, both of Yokohama, Japan

[73] Assignee: E. I. duPont de Nemours and Company, Wilmington, Del.

[21] Appl. No.: 881,319

[22] Filed: Jun. 25, 1997

[51] Int. Cl.$^6$ .................. H01M 8/04; H01M 8/10
[52] U.S. Cl. .................. 429/34; 429/39; 429/210
[58] Field of Search .................. 429/34, 39, 210

[56] References Cited

U.S. PATENT DOCUMENTS

| | | | |
|---|---|---|---|
| 3,134,696 | 5/1964 | Douglas et al. | 136/86 |
| 3,589,942 | 6/1971 | Leitz, Jr. et al. | 136/86 |
| 4,615,955 | 10/1986 | Amakawa et al. | 429/34 |
| 4,755,272 | 7/1988 | Plowman | 429/39 X |

FOREIGN PATENT DOCUMENTS

| | | | |
|---|---|---|---|
| 33 21 984 A1 | 12/1983 | Germany | H01M 2/16 |
| WO 96/18217 | 6/1996 | WIPO | H01M 8/24 |

OTHER PUBLICATIONS

Japanese Patent Abstract, Application No. 63–125897, filed May. 25, 1988 and published Nov. 29, 1989, Hitachi Ltd.
Chemical Abstract No. 1340–12, vol. 101, No. 16, Oct. 15, 1984, "Substitutes for carbon in fuel cell applications", Jalan, Vinod M.

*Primary Examiner*—John S. Maples

[57] ABSTRACT

A polymer electrolyte membrane fuel cell comprised of polymer electrolyte membranes, gas diffusion electrodes that sandwich the membranes, and bipolar plates operating as gas separation plates and current collectors with fuel/oxidizing agent supply and discharge passages provided by projections on both of its surfaces. A bipolar plate is employed which comprises projections on the bipolar plate of a melt-processible polymer having good fluidity and a coating on the surfaces of the bipolar plate comprising metal, metal nitride or metal carbide.

5 Claims, 2 Drawing Sheets

1

POLYMER ELECTROLYTE MEMBRANE FUEL CELL WITH BIPOLAR PLATE HAVING MOLDED POLYMER PROJECTIONS

FIELD OF THE INVENTION

This invention relates a polymer electrolyte membrane fuel cell for direct generation of electrical energy from fuel and an oxidizing agent and, specially, it relates to a bipolar plate structure for a fuel cell that has a high degree of resistance to corrosive electrolytes and is easily manufactured.

BACKGROUND OF THE INVENTION

In recent years, polymer electrolyte membrane fuel cells have been developed for their advantages over conventional electrical power sources in high power generation, high efficiency, etc. Polymer electrolyte membrane fuel cells typically have a multiplicity of unit cells in an stacked arrangement, each comprised of a cathode and an anode which are opposingly positioned gas diffusion electrodes. A polymer electrolyte membrane is located between and is maintained in contact with the electrodes. Bipolar plates are provided between cells and contact the gas diffusion electrodes of adjacent cells and each side of the bipolar plate provides gas passages to the electrode. A fuel cell generates power through electrochemical reaction between the anode and cathode when supplying fuel and oxidizing agent to the fuel passages on the anode side and the oxidizing agent chamber on the cathode side, respectively.

In a fuel cell, when fuel and oxidizing agent are independently and simultaneously supplied to the different electrodes, an electrochemical potential is generated across these electrodes. When an electrical load is placed across these electrodes, a current flows between them and, as a result, chemical energy is directly converted to electrical energy at high efficiency as mentioned above, by having the fuel oxidized at one electrode and the oxidizing agent reduced at the other electrode, both in an electrocatalytic manner.

The polymer electrolyte membrane in such fuel cells is advantageously provided by a high molecular weight ion-exchange fluorine-containing polymer having one or more functional groups which can be sulfonic acid groups, carboxylic acid groups, phosphoric acid groups or phosphonic acid groups. The polymer of the ion-exchange membrane of the electrolyte is preferably a copolymer of tetrafluoroethylene and fluorovinyl compound which is expressed by $CF_2=CF-(OCF_2CFX)_m-O_q-(CF_2)_nA$ (where m=0–3, n=0–12, q=0 or 1, X=F or $CF_3$, A=a sulfonic acid functional group, a carboxylic-acid functional group, a phosphoric acid functional group).

Preferable examples of such fluorovinyl compounds can be:

$CF_2=CFO(CF_2)_{1-8}A$
$CF_2=CFO\ CF_2CF(CF_3)O(CF_2)_{1-8}A$
$CF_2=CF(CF_2)O_{0-8}A$
$CF_2=CF(O\ CF_2CF(CF_3))_{1-5}(CF_2)_2A$

Alternatively, perfluoroolefins, such as hexafluoropropylene, chlorotrifluoroethylene, perfluoroalkoxyvinyl ether can be used instead of the tetrafluoroethylene, as the monomer that comprises the fluorocarbon polymer with functional group.

If necessary after copolymerization, the polymer is converted to a proton-exchanging functional group, for example, by post-treatment such as hydrolysis, etc. The conversion capacity of a component with functional group is defined by the number of moles of the functional group per 1 g and normally it is measured by the titration method. In general, a conversion capacity of the component with functional group of 0.8–2 meq/g and 0.9–2 meq/g is preferred. When it is less than 0.8 meq/g, the resistance becomes high and performance suffers. Also, when it is above 2 meq/g, the standard strength of the membrane is decreased.

Sulfonated perfluorocarbon membrane such as that commercially available from E. I. du Pont de Nemours and Company, Wilmington, Del., USA, under the trademark NAFION® is advantageously used as the polymer electrolyte membrane because of its strength, dimensional stability and electrical properties.

Bipolar plates in polymer electrolyte fuel cells are typically machined from a carbon block with strong corrosion resistance, no gas permeability and with good electrical conductivity. The fuel/oxidizing agent supply and discharge passages are machined on both sides of the bipolar plate and, since the concave/convex shape and layout of the concave/convex parts of the bipolar plate of these passages determine the uniform distribution of the gas flow at a uniform density onto the electrode surface, the structures are extremely complex. Therefore, manufacture of bipolar plates is very difficult. In addition, when a bipolar plate is made of standard grade carbon, a leak current sometimes runs in the bipolar plate across the electrolyte and electrodes and corrosion can occur in the bipolar plate. It has been difficult to manufacture from a single material a bipolar plate for polymer electrolyte fuel cells which exhibits a high degree of resistance to the corrosive electrolyte, has good current collection function and a high degree of structural integrity.

SUMMARY OF THE INVENTION

The invention in an improvement in a polymer electrolyte membrane fuel cell comprised of polymer electrolyte membranes, gas diffusion electrodes that sandwich the membranes, and bipolar plates operating as gas separation plates and current collectors with fuel/oxidizing agent supply and discharge passages provided by projections on both of its surfaces. An improved bipolar plate is employed which comprises projections of a melt-processible polymer of good fluidity and a coating on the surfaces of the bipolar plate comprising metal, metal nitride or metal carbide.

This invention provides a solid high molecular electrolyte-type fuel cell of good resistance against an corrosive electrolyte, good current collection function, simple structure, simple production process, and reduced size, weight, and manufacturing cost.

Figure 1:
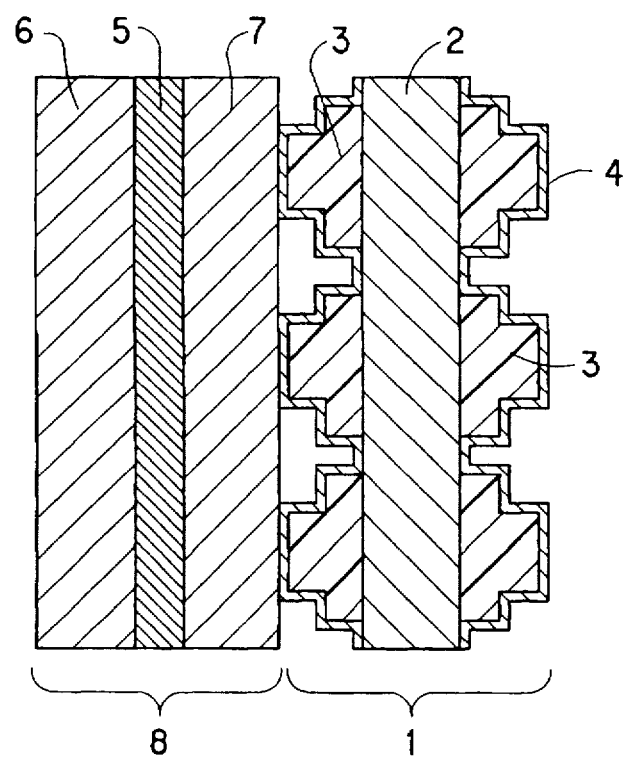
FIG. 1 is cross-sectional view which illustrates a preferred polymer electrolyte membrane fuel cell in accordance with this invention as described in more detail in the Example.

Explanation of the reference characters:

1—bipolar plate
2—aluminum plate
3—projections
4—metal thin film
5—high-molecular weight electrolyte membrane
6—cathode
7—anode
8—membrane electrode composite.

Figure 2:
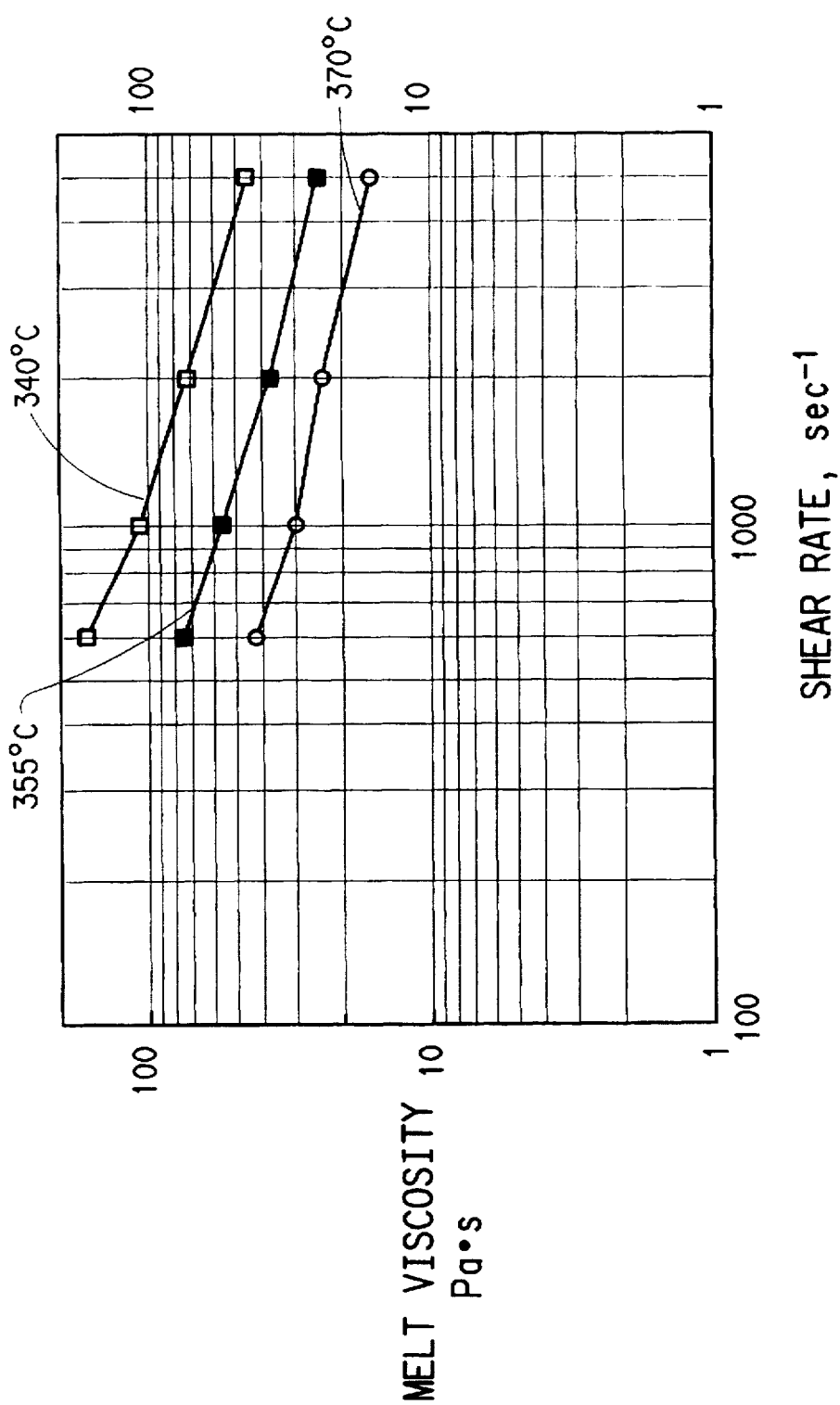

FIG. 2 is a log/log plot of melt viscosity against shear rate for a preferred liquid crystal polymer useful in the manufacture of the projections for the bipolar plate in a fuel cell in accordance with the present invention.

DETAILED DESCRIPTION

In the polymer electrolyte membrane fuel cell of this invention, an aluminum plate is advantageously used as the base material of the bipolar plate and projections for formation of the gas-passage means are injected-molded on its surface using a melt-processible polymer with good fluidity. For injection molding, a die having the required shape to form in projections is used and the aluminum plate is set in a die cavity by hold-down pins. With the die is closed, polymer of good fluidity is injected into the cavity for integral molding of the projections that form the fuel/oxidizing agent supply and discharge passages on the surface of the aluminum plate.

The surface of the projections forming the supply and discharge passages and exposed surface of the aluminum plate are surface-treated with a metal, or metal nitride or metal carbide, such as Ti, Au, Nb, TiN, TiC, TiCN, CrN, etc. to form a collector. The coating can be applied by sputtering, chemical vapor deposition (CVD), physical vapor deposition (PVD), etc. The bipolar plate thus produced has good strength, elasticity, dimensional stability, heat resistance, corrosion resistance, structural integrity, and core properties. A metal nitride and metal carbide having superior corrosion resistance, wear resistance, and volume-specific resistance of the order of 10 to −3 ohm cm, and are optimal for surface treatment. In addition, this bipolar plate can achieve size/weight and manufacturing cost reductions in fuel cells in which the unit cells of the membrane electrode composite are comprised of a laminated cathode, an anode, and high-molecular weight electrolyte.

The polymer of good fluidity used to form such gas-passage means on the base plate of a bipolar plate is a polymer which has a sufficiently high flow rate at its normal processing temperatures that it can be formed into $\leq 1$ mm projections. Polymers useful for the present invention include be polyphenyl sulfide, modified polyphenylene oxide, polyoxymethylene, polyamide, polycarbonate with $\leq 10\%$ content of reinforcing agent, polyethylene terephthalate with $\leq 30\%$ content of reinforcing agent, polybutylene terephthalate, acrylonitrile/butadiene/styrene, polymethyl methacrylate, liquid crystal polymers and polyolefins, because of their fluidity and surface smoothness. However, the polymer not limited to those listed above as long as the polymer properties can be maintained for a long period at 50°–80° C. in saturated water vapor, which are normal operating conditions of this fuel cell. Liquid crystal polymers are the most preferable polymer for use in this invention, because of their resistance to hydrolysis, good molding fluidity and small content of metal containing ions, and which do not inhibit the ionic conductivity of the high-molecular electrolyte membrane. Suitable components for the liquid crystal polymer are compositions i) of one or more of aromatic dicarboxylic acid, alicyclic dicarboxylic acid; ii) of one or more of aromatic diol, alicyclic diol, and aliphatic diol; iii) of one or more of aromatic hydroxycarboxylic acid; iv) of one or more of aromatic thiocarboxylic acid; v) of one or more of aromatic dithiol and aromatic thiophenol; vi) ones comprised of one or more of aromatic hydroxyamine and aromatic diamine, etc., and polymers that form an anisotropic molten phase, are polyesters that form an anisotropic molten phase, which are comprised of a combination of a) the polyester of i) and ii); b) the polyester of only iii); c) the polyester of i), ii), and iii); d) the polythiol ester of only iv); e) the polythiol ester of i) and v); f) the polythiol ester of i), iv), and v); g) the polyester amide of i), iii), and vi); h) the polyester amide of i), ii), iii), and vi).

For a liquid crystal polymer such as the polyester-type polymer sold by E. I. du Pont de Nemours and Company under the trademark ZENITE® HX 6130, typical molding conditions for the formation of projections to provide the gas-passage means are, for example, 60° C. die temperature, 350°–360° C. resin temperature, 0.5–1 sec pressure retention time and approximately 10 sec molding cycle. FIG. 2 is a log/log plot of melt viscosity against shear rate for ZENITE® HX 6130 liquid crystal polymer which demonstrates the good fluidity possessed by this polymer. The good fluidity of ZENITE® HX 6130 (30% glass reinforced LCP) is also illustrated by its spiral flow of 24 cm flow for 0.5 mm thickness under 800 kg/cm² at 355° C. Spiral flow is determined by measuring the distance that the molten polymer flows into a specific thickness mold with a spiral shape at 60° C.

CRASTIN® SK645FR 30% glass reinforced polybutylene terephthalate polymer sold by E. I. du Pont de Nemours and Company also has good fluidity for use in the present invention with a spiral flow of 7.0 cm flow for 0.8 mm thickness under 800 kg/cm² at 255° C.

Also, polyethylene, polypropylene, polystyrene, polymethylpentene or their copolymers are preferred polyolefins because of their superior acid resistance, hydrolysis resistance, and fluidity in melt processing.

Polyethylene is produced by polymerization of ethylene and the basic molecular structure of polyethylene is a mixture of chains of a few thousands to a few hundred thousands —(CH2) groups, and it is considered to be a long-chain hydrocarbon with a molecular weight distribution. When the average molecular weight increases, the softening point, too, increases slightly. Polyethylene comes in the following types according to its manufacturing method. Polyethylene is produced through the direct polymerization of ethylene gas by a high, medium, or low pressure method and polyethylenes of slightly different properties are produced by these methods.

Polyethylene produced by the high pressure method has a density of 0.91–0.94 and that produced by medium/low pressure has a wide density range of 0.91–0.97; that having $\geq 0.94$ density and that having $<0.94$ density re classified as high-density polyethylene and linear low-density polyethylene, respectively. The molding conditions of polyethylene are 150°–210° C. resin temperature, 40°–50° C. die temperature and 20–40 seconds molding cycle, in general.

Polypropylene is a crystalline high molecular substance with the propylene molecules —(CH$_2$—CH(CH$_3$))— arranged regularly in space and its specific gravity is 0.90, which is the lightest next to polymethylpentene. Its melting point is 165° C., its compressive strength and impact strength are good and its surface hardness is high. As for its moldability, it has good fluidity and it can be molded into a thin and complex shape. Its shrinkage during molding is smaller than that of polyethylene. Its shrinkage difference in two directions, lateral and longitudinal, is small and it is a well balanced polymer. The general molding conditions for polypropylene are 190°–230° C. resin temperature, 40°–80° C. die temperature and 20–40 sec. molding cycle.

Polystyrene is a polymer obtained by the polymerization of the sytrene monomer (CH$_2$=CH(C$_6$H$_5$))— and it has good moldability, transparency, dimensional stability and water resistance. It also has good chemical resistance to acids and alkalis. The molding conditions of polystyrene are 200°–230° C. resin temperature, 30°–50° C. die temperature, and 30–60 sec. molding cycle.

Polymethylpentene is 4-methylpentene-1, polymerized by the Ziegler-Natta catalyst and has the structure:

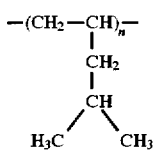

Its melting point is 230°–240° C., the specific gravity is 0.83 and it is the lightest among the thermoplastic resins. It is a polymer with good chemical resistance.

EXAMPLE

As shown in FIG. 1, after the aluminum plate of base plate 2 of bipolar plate 1 is set in the cavity die of the injection molding machine, the aluminum plate is fixed by the action of aluminum-plate hold-down pins in the die, the die is closed, polymer of good fluidity, e.g. liquid crystal polymer, is injected in the cavity and projections 3 with fuel/oxidizing agent supply and discharge passages formed on aluminum plate 2 of bipolar plate 1 are molded integrally. Then, a metal or metal nitride or metal carbide, selected from Au, Ti, Nd, TiN, TiC, TiCN, CrN, etc. is formed as a film 4 on the surface of bipolar plate 1 with projections 3 formed on it, by generally known chemical gas-phase evaporative deposition (CVD), physical gaseous phase evaporative deposition (PVD) or the sputtering method. The tips of the projections 3 formed with a polymer of good fluidity, on which surface thin film 4 of the metal or metal nitride or metal carbide is formed, are formed to a height that contacts the high molecular weight electrolyte membrane 5, e.g. outside electrode of membrane electrode composite 8 integrally formed with sulfonated perfluorocarbon membrane sold under the trademark NAFION® by E. I. du Pont de Nemours and Company. Cathode 6 and anode 7 sandwich the membrane for the collection of electrical current and, at the same time, form the fuel chamber, which is a gas-passage means between the concave part of the metal plate 2 and the anode 7, and form an oxidizing agent chamber between the concave part of the metal plate 2 and the cathode 6.

What is claimed is:

1. In a polymer electrolyte membrane fuel cell comprised of polymer electrolyte membranes, gas diffusion electrodes that sandwich the membranes, and bipolar plates, each said bipolar plate having surfaces, said bipolar plates operating as gas separation plates and current collectors with fuel/oxidizing agent supply and discharge passages provided by projections on both of said surfaces, the improvement which comprises forming at least said projections of said bipolar plate with a melt-processible polymer having good fluidity, and a coating on the surfaces of said bipolar plate comprising metal, metal nitride or metal carbide.

2. The polymer electrolyte membrane fuel cell of claim 1 wherein said melt-processable polymer is selected from the group consisting of polyphenyl sulfide, modified polyphenylene oxide, polyoxymethylene, polyamide, polycarbonate with ≦10% content of reinforcing agent, polyethylene terephthalate with ≦30% content of reinforcing agent, polybutylene terephthalate, acryloriitrile/butadiene/styrene, polymethyl methacrylate, liquid crystal polymers and polyolefins.

3. The polymer electrolyte membrane fuel cell of claim 2 wherein said polymer of good fluidity is selected from the group consisting of liquid crystal polymers.

4. The polymer electrolyte membrane fuel cell of claim 1 wherein said said coating on said surfaces is selected from Ti, Au, Nb, TiN, TiC, TiCN, and CrN.

5. The polymer electrolyte membrane fuel cell of claim 1 wherein said bipolar plate comprises an aluminum plate as a base and said projections are injection molded onto into its surfaces.

* * * * *